J. C. KITTON.
HEAT ABSORBING DEVICE.
APPLICATION FILED SEPT. 11, 1916.
1,246,279.
Patented Nov. 13, 1917.
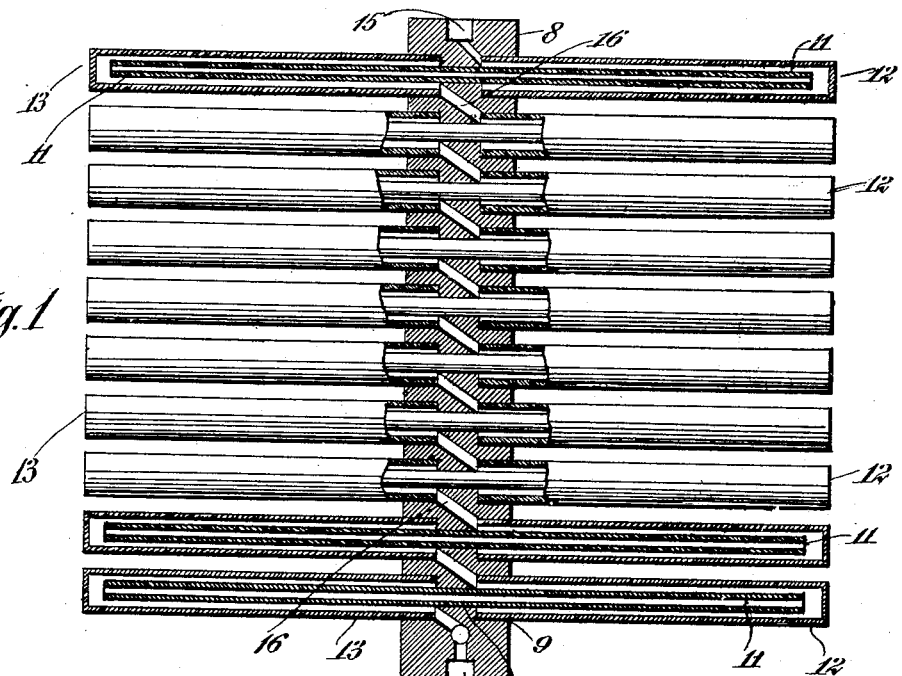
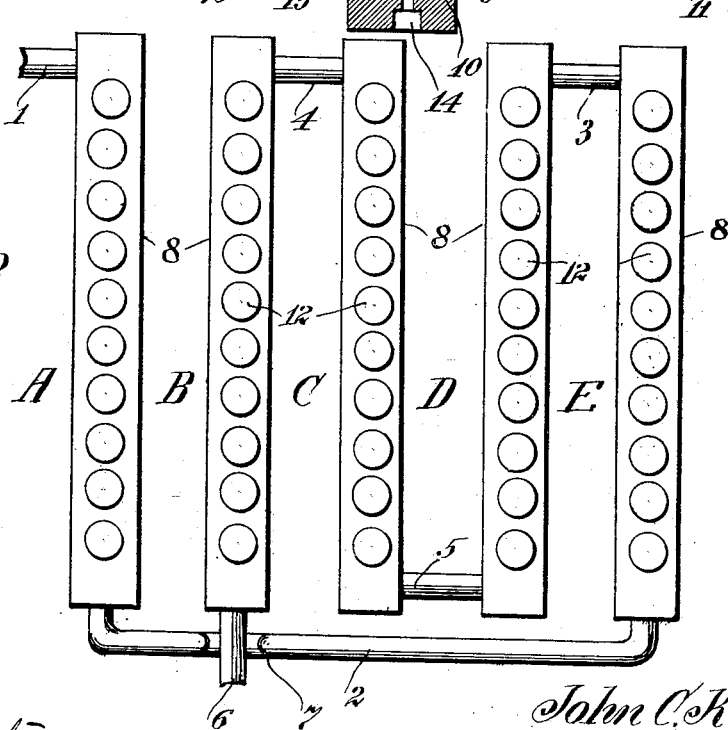

UNITED STATES PATENT OFFICE.

JOHN C. KITTON, OF CHICAGO, ILLINOIS.

HEAT-ABSORBING DEVICE.

1,246,279.  Specification of Letters Patent.  Patented Nov. 13, 1917.

Application filed September 11, 1916. Serial No. 119,345.

*To all whom it may concern:*

Be it known that I, JOHN C. KITTON, a citizen of the United States of America, residing at Chicago, in the county of Cook and State of Illinois, have invented certain new and useful Improvements in Heat-Absorbing Devices, of which the following is a specification, reference being had therein to the accompanying drawings.

This invention relates to a heat absorbing device, and more particularly to a device forming part of a refrigeratory apparatus or system disclosed by my companion application filed Sept. 11, 1916, Serial No. 119,342.

In my companion application there is described and illustrated a refrigeratory apparatus that can be advantageously used for household purposes, as the apparatus is very compact. Contributing to this compactness is a heat absorbing device of novel construction, in so much that it provides an extensive circulation for a liquid that can be readily gasified by absorbing heat.

The primary object of the present invention is therefore to provide a heat absorbing apparatus or device that will afford extensive sinuous or tortuous passages for a liquid, as ammonia, that may be gasified, in as small a space as possible, and this is accomplished by providing a group or battery of parallel communicating heads, having a series of opposed parallel inner and outer conduits which will continually conduct a liquid against surfaces capable of absorbing heat and eventually convert the liquid into a gas.

A further object of my invention is to provide a heat absorbing unit capable of being readily associated with other units of a similar character, and each unit is composed of parts that are simple in construction, durable, inexpensive to manufacture, easy to assemble, and highly efficient for the purposes for which they are intended.

The above and other objects are attained by a mechanical construction that will be hereinafter specifically described and then claimed, and reference will now be had to the drawings, wherein—

Figure 1 is a longitudinal sectional view of a heat absorbing unit, partly in elevation;

Fig. 2 is an end view of a group or battery of units connected to provide an extensive circulating system.

In Fig. 2 the heat absorbing units are generally designated A. B. C. D and E, said units being identical in construction. The unit A is adapted to receive a supply of liquid, such as ammonia, from a suitable supply pipe 1, this pipe being connected to the top of the unit and another pipe 2 leading from the bottom of the unit to the bottom of the unit E. The upper ends of the heat absorbing units E and D are connected by a pipe 3; the upper ends of the units B and C are connected by a pipe 4; the lower ends of the units C and D connected by a pipe 5, and the lower end of the heat absorbing unit D provided with a suitable outlet pipe 6. The pipe 2 may be offset to provide clearance for the pipe 6, as indicated at 7.

Considering each unit in detail, reference will now be had to Fig. 1 showing a distributing head 8 having opposite sides thereof provided with alining recesses 9 and establishing communication between the recesses in one face of the head and the recesses in the other face of the head are openings 10, said openings being of a less diameter than the recesses 9. Mounted in the openings 10 and protruding from the faces of the distributing head 9 are inner conduits 11 disposed in parallelism with the outer ends thereof open.

Mounted in the recesses 9 and inclosing the inner conduits 11 are outer conduits 12 and 13, the conduits 12 being disposed in parallelism from one face of the distributing head 8 and the outer conduits 13 in parallelism at the opposite side of the head. The inner and outer conduits 11 and 12 are tubular and with the outer ends of the conduits 12 closed and in proximity to the outer open ends of the inner conduits 11, a liquid passing through the outer conduits 12 may enter the inner conduits 11 or vice versa. In either instance, the liquid passing between the inner and outer conduits provides a thin film or body of liquid that may readily absorb heat from the walls of the outer conduits 12 and in so doing be quickly gasified.

The lower face of the distributing head 8, intermediate the ends thereof, has an opening 14 for a pipe connection and the opening 14 communicates with the lowermost outer conduit 13. The upper face of the distributing head 8 has an opening 15, intermediate the ends thereof, for a pipe connection and said opening communicates with the uppermost outer conduit 12. The remaining outer conduits 12 communicate with the other outer conduits 13 by angularly disposed ports 16 formed in the distributing head 8 and establishing communication between the inner ends of the outer conduits 12 and the inner ends of the outer conduits 13, thereby providing a sinuous or tortuous passage for liquid from one face of the distributing head 8 to the other face thereof.

It is apparent that the inner and outer conduits may be made of such length as to provide an expensive passage for liquid and considering that the unit or battery of units is submerged in brine or a similar agent, that there will be a large area to which the ammonia on entering the distributing head and the conduits thereof will be exposed to absorb heat and before leaving the distributing head be thoroughly gasified.

The heat absorbing apparatus has been herein specifically referred to for gasifying ammonia in connection with refrigeratory systems, but it is to be understood that the device may be used for gasifying liquids other than ammonia and that it may also be used for the distillation of liquid. Therefore, my invention is susceptible to such variations and modifications which will adapt the device to various uses.

What I claim is:—

1. A device of the type described, composed of communicating heat absorbing units, and each unit comprising a distributing head, inner conduits extending through said head, and outer communicating conduits carried by said head and inclosing and communicating with said inner conduits, said distributing head having an opening communicating with lowermost outer conduits, and an opening communicating with uppermost outer conduits.

2. A heat absorbing unit comprising a distributing head, inner conduits extending through said head, and outer communicating conduits carried by said head and inclosing and communicating with said inner conduits.

3. A heat absorbing unit comprising a distributing head, parallel longitudinally alining outer conduits extending from opposite faces of said head, and inner conduits mounted in said head and extending into said outer conduits.

4. A heat absorbing unit comprising a distributing head, parallel outer conduits extending from opposite faces of said head, said head having ports therein establishing communication between the outer conduits on one face thereof and the outer conduits on the opposite face of said head, and inner conduits mounted in said head and extending into said outer conduits.

5. A heat absorbing unit comprising a distributing head, parallel inner conduits extending through said head and having the ends thereof open, and outer conduits inclosing the ends of said inner conduits, said outer conduits having the outer closed ends thereof in proximity to the outer open ends of said inner conduits, and said head having ports therein establishing communication between the inner ends of said outer conduits and inlet and outlet openings in said head.

In testimony whereof I affix my signature in presence of two witnesses.

JOHN C. KITTON.

Witnesses:
ANNA M. DORR,
KARL H. BUTLER.

Copies of this patent may be obtained for five cents each, by addressing the "Commissioner of Patents, Washington, D. C."